(12) United States Patent
Dhingra

(10) Patent No.: US 7,167,912 B1
(45) Date of Patent: Jan. 23, 2007

(54) METHOD AND APPARATUS FOR DETECTING FAILURES IN NETWORK COMPONENTS

(75) Inventor: Anurag Dhingra, Fremont, CA (US)

(73) Assignee: Cisco Technology, Inc., San Jose, CA (US)

(*) Notice: Subject to any disclaimer, the term of this patent is extended or adjusted under 35 U.S.C. 154(b) by 851 days.

(21) Appl. No.: 10/215,636

(22) Filed: Aug. 9, 2002

(51) Int. Cl.
*G06F 15/173* (2006.01)

(52) U.S. Cl. .................... 709/223; 709/224; 714/43

(58) Field of Classification Search ............... 709/229, 709/238, 246, 201, 223–225, 207, 202, 217; 370/252, 401, 339, 352; 714/43; 340/5.8
See application file for complete search history.

(56) References Cited

U.S. PATENT DOCUMENTS 5,566,339 A * 10/1996 Perholtz et al. ............. 713/340

(Continued)

OTHER PUBLICATIONS

Bandwidth allocation of variable bit rate video in ATM networks using radial basis function neural networks Youssef, S.A.; Habib, I.W.; Saadawi, T.N.;Communications, 1999. ICC '99. 1999 IEEE International Conference on vol. 1, Jun. 6-10, 1999 pp. 152-156.*
Monitoring system activity for OS-directed dynamic power management Benini, L.; Bogliolo, A.; Cavallucci, S.; Ricco, B.; Low Power Electronics and Design, 1998. Proceedings. 1998 International Symposium on Aug. 10-12, 1998 pp. 185-190.*
Dynamic dispatch and graphical monitoring system Pierce, N.G.; Yurtsever, T.; Advanced Semiconductor Manufacturing Conference and Workshop, 1998. 1998 IEEE/SEMI Sep. 23-25, 1998 pp. 464-468.*

Reliable Multicast Data Delivery For Military Networking—Macker, Klinker, Corson (1996) www.itd.nrl.navy.mil/ITD/5540/publications/CHACS/1996/1996macker-IEEEMILCOM.ps.*
Analysis of Link Layer Backoff Schemes on Point-to-Point..—Soni, Chockalingam (2000) ece.iisc.ernet.in/~achockal/psfiles/revised_manuscript.ps.*
Fragment Adaptive Reduction: Coping with Various Interferers in ..—Tourrilhes (2000) www.hpl.hp.com/techreports/2000/HPL-2000-11.pdf.*
Webpage http://www.cisco.com/warp/public/cc/pd/iosw/ioft/iolk/tech/rdius_wp.htm entitled "Cisco IOS Technologies: RADIUS Support in Cisco IOS Software", Jun. 1996, pp. 1-11.

*Primary Examiner*—Thong Vu
(74) *Attorney, Agent, or Firm*—Marger Johnson & McCollom P.C.

(57) ABSTRACT

A monitoring system includes a monitoring component that compares a number of application-specific request packets sent with a number of response packets received pursuant to the sent request packets during a designated monitoring period to detect failure in a monitored component without using any pinging packets. The application-specific request and response packets contain data to perform tasks specific to an application that is not associated with operational status monitoring information and the request and response packets are not specifically ping packets. A method for monitoring includes counting a number of application-specific request packets sent with a number of response packets received during a monitoring period without any pinging. If one or more request packets are sent but no response packets are received during a designated monitoring period, the monitored component is identified as failed. If some, but not all, response packets are received, the monitored component is identified as operational. Alternatively, if no response packets are received after a first monitoring period, the monitored component is identified as potentially failed. If no response packets are received after the end of a second monitoring period, the monitored component is identified as failed.

27 Claims, 4 Drawing Sheets

U.S. PATENT DOCUMENTS

| | | | |
|---|---|---|---|
| 5,636,345 A * | 6/1997 | Valdevit | 709/224 |
| 5,758,077 A * | 5/1998 | Danahy et al. | 709/201 |
| 5,793,975 A * | 8/1998 | Zeldin | 709/224 |
| 6,058,420 A * | 5/2000 | Davies | 709/224 |
| 6,244,758 B1 * | 6/2001 | Solymar et al. | 709/224 |
| 6,266,335 B1 * | 7/2001 | Bhaskaran | 370/399 |
| 6,300,863 B1 * | 10/2001 | Cotichini et al. | 340/5.8 |
| 6,377,982 B1 * | 4/2002 | Rai et al. | 709/217 |
| 6,393,484 B1 * | 5/2002 | Massarani | 709/227 |
| 6,400,722 B1 * | 6/2002 | Chuah et al. | 370/401 |
| 6,434,626 B1 * | 8/2002 | Prakash et al. | 709/238 |
| 6,445,679 B1 * | 9/2002 | Taniguchi et al. | 370/232 |
| 6,466,964 B1 * | 10/2002 | Leung et al. | 709/202 |
| 6,526,442 B1 * | 2/2003 | Stupek et al. | 709/224 |
| 6,535,769 B1 * | 3/2003 | Konar | 700/14 |
| 6,564,261 B1 * | 5/2003 | Gudjonsson et al. | 709/227 |
| 6,574,197 B1 * | 6/2003 | Kanamaru et al. | 370/252 |
| 6,654,914 B1 * | 11/2003 | Kaffine et al. | 714/43 |
| 6,772,096 B2 * | 8/2004 | Murakami et al. | 702/184 |
| 6,823,382 B2 * | 11/2004 | Stone | 709/224 |
| 6,882,653 B1 * | 4/2005 | Kiuchi et al. | 370/401 |
| 6,892,131 B2 * | 5/2005 | Coffee et al. | 701/200 |
| 6,967,958 B2 * | 11/2005 | Ono et al. | 370/401 |
| 7,000,150 B1 * | 2/2006 | Zunino et al. | 714/38 |
| 7,015,817 B2 * | 3/2006 | Copley et al. | 340/573.4 |
| 7,047,288 B2 * | 5/2006 | Cooper et al. | 709/223 |
| 2002/0080752 A1 * | 6/2002 | Johansson et al. | 370/338 |
| 2002/0083175 A1 * | 6/2002 | Afek et al. | 709/225 |
| 2002/0120727 A1 * | 8/2002 | Curley et al. | 709/223 |
| 2002/0188713 A1 * | 12/2002 | Bloch et al. | 709/223 |
| 2002/0188870 A1 * | 12/2002 | Gong et al. | 713/201 |
| 2003/0061363 A1 * | 3/2003 | Bahl et al. | 709/229 |
| 2003/0172090 A1 * | 9/2003 | Asunmaa et al. | 707/200 |
| 2003/0225642 A1 * | 12/2003 | Baker et al. | 705/35 |
| 2004/0015579 A1 * | 1/2004 | Cooper et al. | 709/223 |
| 2004/0047345 A1 * | 3/2004 | Joseph et al. | 370/352 |
| 2004/0255048 A1 * | 12/2004 | Lev Ran et al. | 709/249 |

* cited by examiner

METHOD AND APPARATUS FOR DETECTING FAILURES IN NETWORK COMPONENTS

BACKGROUND

The operational status of different network processing devices needs to be monitored to ensure reliable network operation. If a network device is identified as being down, the network administrator or automated mechanisms can reconfigure the network around the failed device to a standby device. The standby device is maintained in the same state as a primary device so that network operations can be maintained if the primary device fails.

It is difficult to accurately identify a device failure. Techniques such as pinging have been developed to monitor network components. Pinging operations monitor devices by sending test packets. If the ping test packet is not returned, a failure condition is identified for the network processing device. However pinging uses substantial network bandwidth to send test packets back and forth between the monitoring device and the device under test.

A Resource Policy Management System (RPMS) consists of multiple stateful components and a state-less component called a Remote Access Service Router (RASER). All of these components are implemented as individual processes and can be deployed on separate hosts. These components communicate with each other via a User Datagram Protocol (UDP). A response always follows a sent request. The RASER acts as a front-end for the system and receives all traffic from Universal Gateways (UGs). The RASER routes this traffic to the appropriate RPMS component. The RASER also routes inter-component traffic.

The stateful RPMS components can be deployed as hot-standby pairs. For fault-tolerance and in case the component fails, all traffic can be re-directed to the RPMS standby component. Since the RASER routes traffic, it should be able to detect component failures and redirect traffic. This includes process, host or network failures.

However, using UDP in RPMS communications can indicate component failures even when the host machine is available. To solve this failure detection problem, pinging is used to periodically send test packets to the RPMS components. If the test packets are not returned (ping failure), communication is switched to a standby component. However, as described above, pinging each RPMS component uses substantial network bandwidth.

SUMMARY OF THE INVENTION

Application-specific packets sent to a component and received back from the component are counted for a monitoring period. If one or more request packets are sent during the monitoring period, but no response packets are received back during the monitoring period, the component is identified as down. Alternatively, the component can be identified as potentially down after the first monitoring period. If no response packets are received back after the end of a second monitoring period, the component is identified as down.

The foregoing and other objects, features and advantages of the invention will become more readily apparent from the following detailed description of a preferred embodiment of the invention which proceeds with reference to the accompanying drawings.

DETAILED DESCRIPTION

Figure 1:
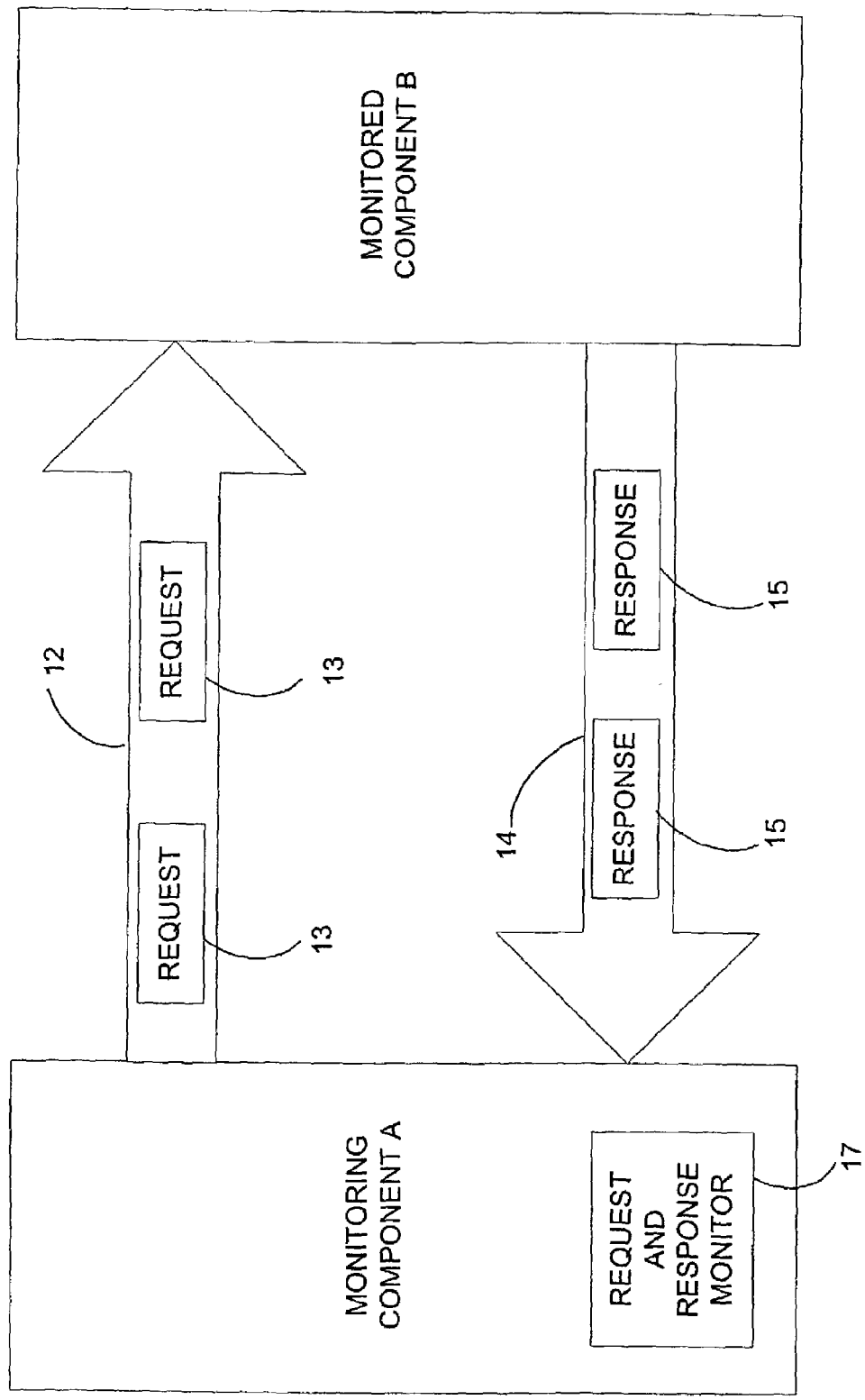
FIG. 1 is a block diagram showing how a component is monitored using application-specific communications.

FIG. 1 shows a system that includes a component A and a component B. In one example, components A and B are software applications that run on network processing devices that communicate over an Internet Protocol (IP) network. In this example, the network processing devices operating components A and B can be routers, switches, network access servers, or any other type of device that communicates over a packet switched Local Area Network (LAN) or Wide Area Network (WAN).

The components A and B may both be on the same machine or separate machines. For example, component A may be located on a network access server and component B may be located on a separate authentication server. Alternatively, components A and B may be associated with software applications or individual processors on the same device.

A software application associated with component A sends application-specific requests 12 to component B. The application associated with component A expects a response 14 pursuant to the request 12. The requests 12 comprise request packets 13 and the responses 14 comprise response packets 15.

There may be a requirement that component A monitor component B and that component A take some appropriate action when it detects that component B has failed. For example, component A may send requests 12 to a standby component (not shown) that can provide similar services when component B is down.

The request 12 and response 14 are not normally used for identifying operational status of component B. However, since each request 12 requires a response 14, a request and response monitor 17 can use the application communication protocol to also determine the operational status of component B. Request packets 13 may be sent to component B, but no response packets 15 may be sent back from component B. From this information the request and response monitor 17 can determine when component B is down. This prevents having to send special ping test packets between the components A and B that require additional network bandwidth.

Any application that sends requests and expects responses to those requests can also be used to monitor operational status of a component. For example, the application may be requesting access to an Internet Service Provider (ISP) network, requesting establishment of a Voice Over IP (VoIP) connection with another endpoint, requesting access a webserver, etc.

The requests 12 and responses 14 are application-specific. This means that either the request 12, response 14, or both, contain information that is used by the receiving component to perform an application that is not associated with component operational status monitoring. For example, the request 12 may send login information that component B uses to authorize component A to access a network system.

Figure 2:
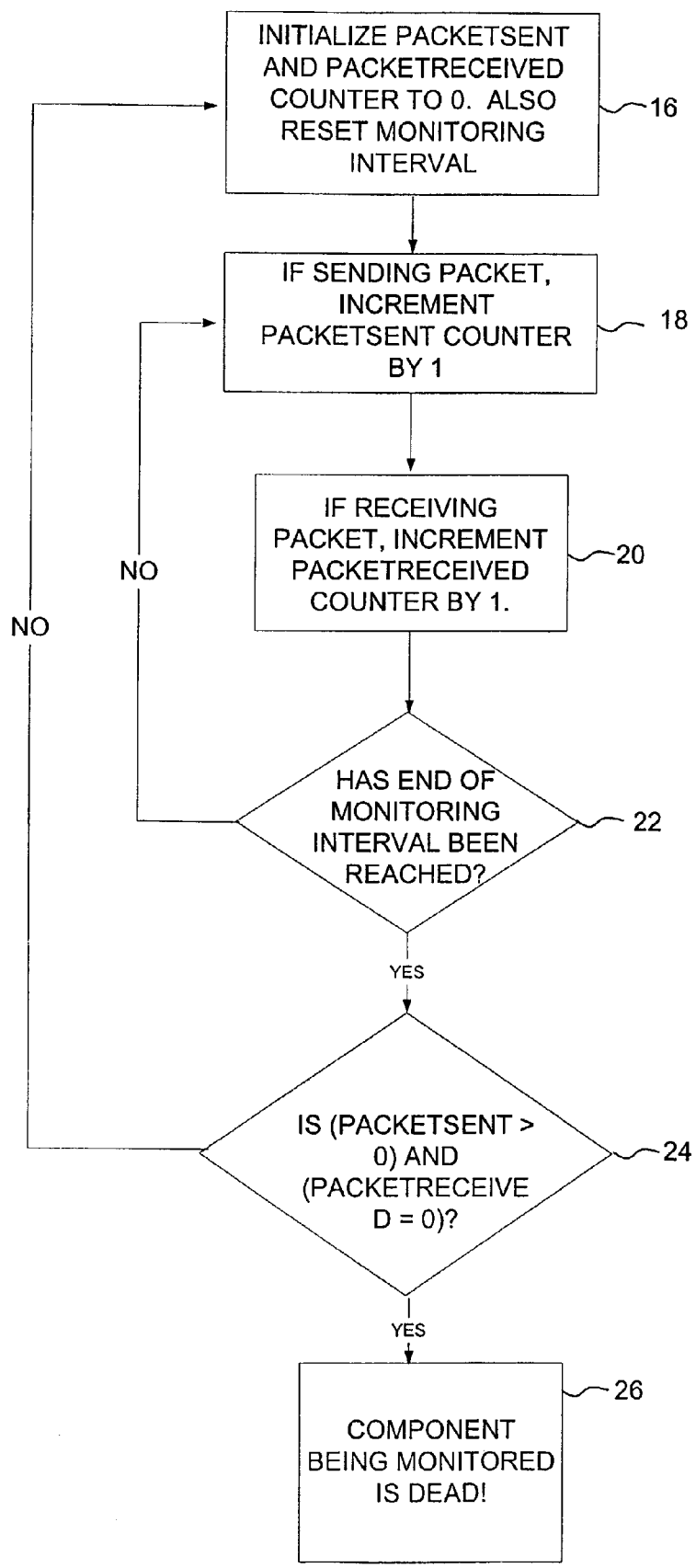
FIG. 2 is a flow diagram showing in further detail how the monitoring scheme in FIG. 1 operates.

FIG. 2 describes the monitoring scheme performed by the request and response monitor 17 of FIG. 1. The monitor 17 in component A initializes a PacketSent counter and a PacketReceived counter both to zero in block 16. A monitoring interval is also reset in block 16. The monitoring interval is used to determine how often to evaluate the PackSent and PacketReceived counters. The monitoring interval can be user configurable and typically is set to a time longer than the typical time required for component A in FIG. 1 to receive a response packet 15 back from component 6 pursuant to a request packet 13.

In block 18 the PacketSent counter is incremented by one each time a request packet 13 is sent by component A. The PacketSent counter is incremented only for request packets 13 that require component B to send back a response packet 15. As explained above, the request packets 13 contain application-specific payloads. For example, component A may be associated with a webbrowser application that requests data from a webserver associated with component B. The webbrowser expects a response back from the webserver for each data request 12.

The PacketRecieved counter is incremented by one in block 20 each time a response packet 15 is received by component A. The number of request packets 13 sent by component A and the number of response packets 15 received by component A continue to be counted until the monitoring interval has been reached in decision block 22.

In decision block 24, the PacketSent count is compared with the PacketReceived count. If the PacketSent count is greater than zero and the PacketReceived count is not zero, then component B is determined to be operational and the monitoring process jumps back to block 16. However, if component A has sent request packets to component B during the monitoring period (PacketSent>0) but no response packets have been received back (PacketReceived=0), component B is identified as dead in block 26.

Component A can take an appropriate action if component B is identified as dead in block 26. For example, component A may send a message to a network system administrator indicating component B as down. Component A can also record the error in memory. Component A could also automatically switch over to another standby component if a failure condition is detected.

Since the monitoring system described above does not rely on periodic pinging or similar mechanisms, traffic overhead is not introduced into the network for component monitoring. The failure detection latency (the time before a failure is detected) is no worse than a ping-based monitoring approach. The monitoring system is also very simple to implement and uses very little programming overhead.

Identifying Failures Over Multiple Monitoring Intervals

A monitoring component could send out a request packet 13 near the end of a monitoring period. In this situation, the monitored component may not be able to send a response packet 15 back before the end of the monitoring period. Because a response packet 15 is not received prior to the end of the monitoring period, the monitoring component could falsely identify the monitored component as dead.

For example, assume that the monitoring period is five seconds. Also assume that the minimum time that component B can send back a response packet is two seconds. Consider a situation where no request packets are sent from component A to component B for the first 4 seconds of the monitoring period. During the fifth second of the monitoring period component A sends a request packet 13 to component B.

When the count check is performed at the end of the monitoring period after the fifth second, a failure is identified for component B since it takes at least two seconds for a response packet to be received back from component B. In other words, component B has not been given enough time to respond to the request packet.

This problem can be solved by identifying component B as potentially dead when it fails during a first monitoring period. Component B is then monitored for an additional monitoring period. If no response packets are received during the first or second monitoring period, component B is identified as dead. This provides enough time for component B to respond to request packets sent at the end of the first monitoring period.

Figure 3:
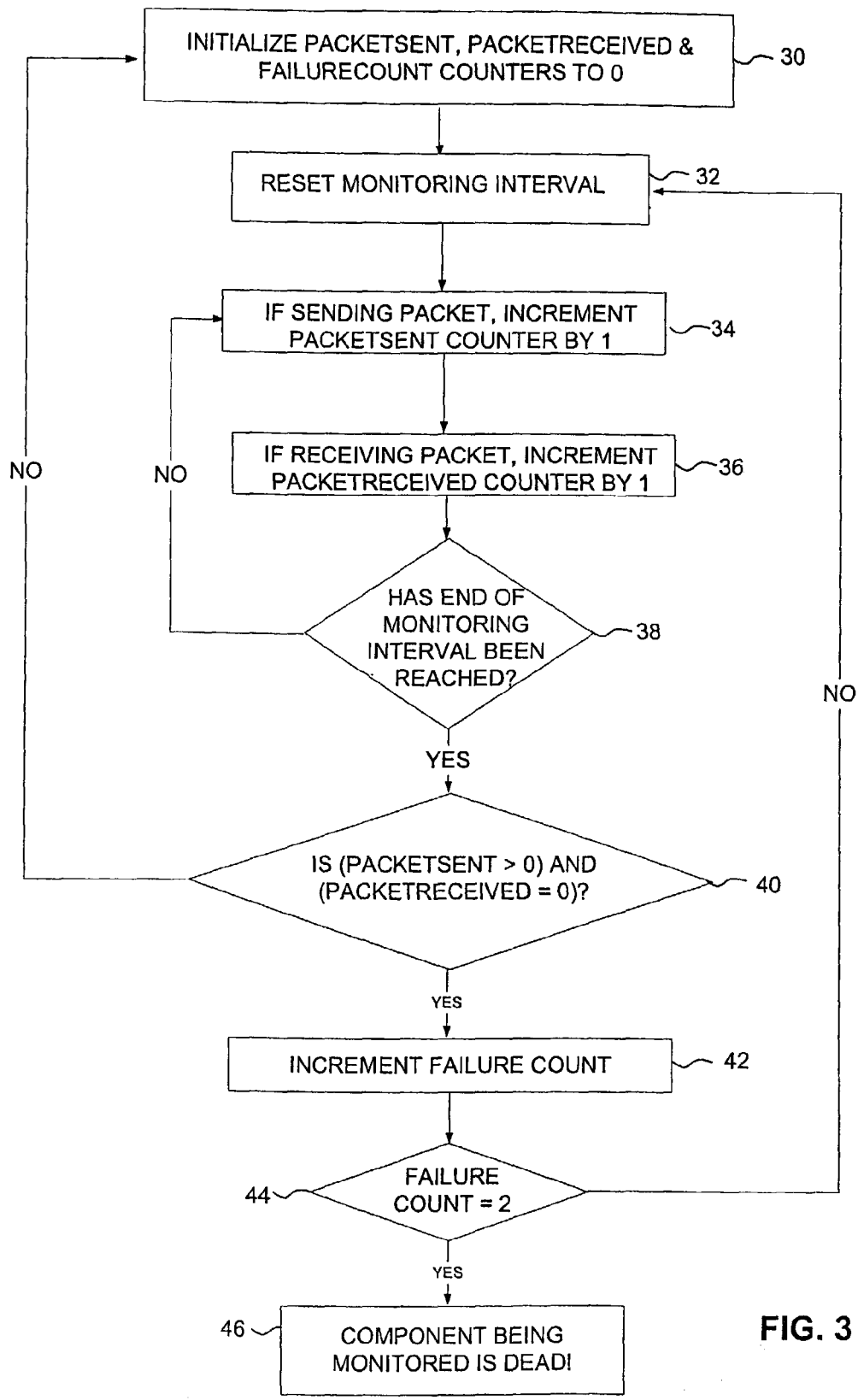
FIG. 3 is a flow diagram showing an alternative monitoring scheme.

FIG. 3 shows in more detail how a component uses multiple monitoring periods to more accurately detect component failures. In block 30 the monitoring component initializes an additional FailureCount counter in addition to the PacketSent and PacketReceived counters. The monitoring period is reset in block 32. The number of request packets 13 and response packets 15 are counted in blocks 34–38 in a manner similar to that described above in FIG. 2.

If the PacketSent count is greater than zero and the PacketReceived count is zero, then the monitoring component increments the FailureCount in block 42. If the FailureCount is less than two in decision block 44, the monitoring component considers component B potentially dead. In the potentially dead state, the monitoring component jumps back to block 32 and resets the monitoring interval. The PacketSent count and the PacketReceived count continue to be tracked for a second monitoring interval in blocks 34–38.

If the PacketReceived count is no longer zero after the end of the second monitoring period, the monitored component is no longer considered potentially dead. The PacketSent and PacketReceived counters are reinitialized in block 30 and another monitoring interval is started.

However, if the PacketReceived counter still remains at zero at the end of the second monitoring period in decision block 40, the FailureCount is incremented again in block 42. The monitored component changes state from potentially dead to dead.

It should be noted that in the examples above the monitored component is not identified as dead even if it responds to some, but not all, of the request packets. This means that the monitored component is still available, even though it may not be operating at maximum efficiency. Knowledge of the monitored component only responding to some of the request packets can be used by the monitoring component to take other actions. For example, an alert email may be sent to the system administrator.

The monitoring component can also vary the criteria for identifying a failure. For example, a failure may be identified if the PacketReceived count does not reach some minimal percentage of the PacketSent count. The monitoring component can also report the PacketReceived and PacketSent counts to the system administrator or switch to communicating with a standby component, when the PacketReceived count falls below a predetermined minimum percentage of the PacketSent count. The number of monitoring periods can also be increased to more than two, before identifying a dead component.

Figure 4:
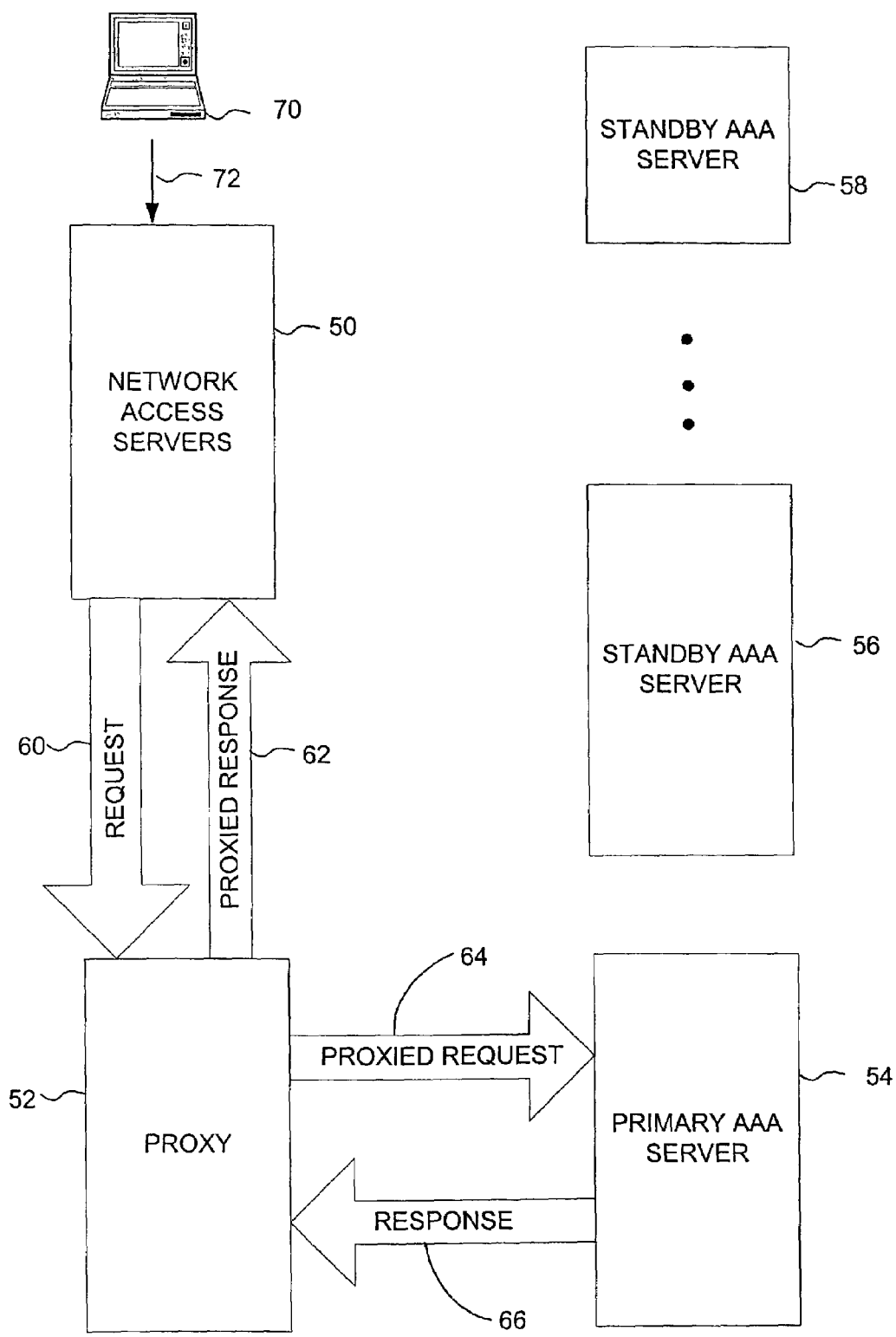
FIG. 4 is a block diagram showing one implementation of the monitoring scheme used in an authentication system.

FIG. 4 shows a specific example where the monitoring system is used in a network access sever 50 to monitor the status of an Authentication Authorization and Accounting (AAA) server 54. Of course this is just one example, and the Network Access Server (NAS) 50 can be any network device that needs to monitor status of another network processing device.

In this example, the NAS 50 receives a dial up request 72 from an endpoint 70. The endpoint 70 may be any Personal Computer (PC), server, Voice Over IP (VoIP) phone, etc. that needs to access another network processing device, endpoint or system in an IP network. For example, the endpoint 70 may want to access an Internet Service Provider (ISP) network. But the endpoint 70 is not allowed to connect into the ISP network until it is authenticated by authentication server 54.

In order to maintain operation even during a server failure, multiple standby servers 56 and 58 may be maintained by the ISP. Each standby server 56 and 58 is maintained in the same state as server 54. One method for maintaining a standby server in the same state as a primary server 54 is described in co-pending U.S. patent application entitled: High Availability Network Processing System, Ser. No. 10/143,066, filed on May 10, 2002 which is herein incorporated by reference.

A proxy 52 can be used for relaying requests 60 and responses 62 between the NAS 50 and the primary server 54. The proxy 52 also maintains a configuration file (not shown) that contains the locations of standby servers 56 and 58. The proxy 52 can hide these connection details from the NAS 50 thus simplifying transmit operations. The proxy 52 may be located on a separate network device or may be located on one of servers 54, 56 or 58.

The proxy 52 typically sends requests to primary server 54 and will switch over to one of the standby servers 56 or 58 if the primary server 54 does not respond to request 64. Any switch-over by proxy 52 can be initiated using the monitoring scheme described above. In this example, the proxy 52 is analogous to component A in FIG. 1 and the server 54 is analogous to component B in FIG. 1.

Responses 66 should be received back for proxied requests 64. The proxy 52 tracks the number of proxied request packets sent to the server 54. The number of packets in request 64 is compared with the number of response packets in response 66 received back from server 54. If during the designated monitoring period(s) one or more request packets are sent, and no response packets are received, the proxy 52 identifies the server 54 as down. The proxy 52 then may switch over to another one of the servers 56 or 58. Operational status of server 54 is identified by piggy backing the operational status monitoring on top of the requests 64 and responses 66 that are already conducted between NAS 50 and server 54. Thus, there is no need to send additional ping packets.

In one specific implementation, the NAS 50 uses a Remote Access Dial-In User Service (RADIUS) request and respond protocol to communicate with proxy 52. In another example, a Resource Policy Management System (RPMS) uses the monitoring scheme described above.

The RADIUS protocol may be used by NAS 50 for transferring authentication and accounting information. The RADIUS protocol is based on the User Datagram Protocol (UDP). Typically, a login for user 70 consists of a query (Access-Request) from the NAS 50 to the RADIUS server 54 and a corresponding response (Access-Accept or Access-Reject) from the RADIUS server 54. In this example proxy 52 and server 54 can be considered the RADIUS server 54.

An access-request packet in request 60 contains the username, encrypted password, NAS IP address, and port information. The format of the request 60 also provides information on the type of session that the user 70 wants to initiate. When the RADIUS server 54 receives the access-request 60 from the NAS 50, it searches a database for the username listed. If the username does not exist in the database, either a default profile is loaded or the RADIUS server 54 immediately sends an access-reject message in response 62. This access-reject message can be accompanied by an optional text message, which can indicate the reason for the refusal.

If the username is found and the password is correct, the RADIUS server 54 returns an access-accept response 62, including a list of attribute-value pairs that describe the parameters to be used for this session. Typical parameters include service type, protocol type, IP address to assign the user, access list to apply, or a static route to install in the NAS routing table. The configuration information in the RADIUS server 54 defines what will be installed on the NAS 50. The monitoring system described above is incorporated in the RADIUS application to automatically identify failures in servers 54–58.

In yet another implementation, block 50 in FIG. 4 may represent a web-browser component, the proxy 52 may represent a web content cache and the primary server 54 may be a web server. The web cache 52 may send certain requests to the web-server 54 that require a response 66. If no response is received for web-browser requests 64 within a designated monitoring period, the web cache switches over to a standby web-server 56 or 58.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. Claims are made to all modifications and variation coming within the spirit and scope of the following claims.

The invention claimed is:

1. A monitoring system, comprising:
    a monitoring component that compares a number of application specific request packets sent by an application with a number of response packets received pursuant to the sent request packets during a designated monitoring period to detect failure in a monitored component without using any pinging packets, wherein the request and response packets contain data used by the monitored component to perform an application that is not associated with component operation status monitoring, and wherein the request and response packets are not specifically ping packets;
    the monitoring component identifies failure in the monitored component if one or more request packets are sent and no corresponding response packet is received by the monitoring component during a designated monitoring period.

2. The system according to claim 1 wherein the monitoring component identifies potential failure in the monitored component when at least one request packet is sent during a first monitoring period and no response packets are received back during the first monitoring period.

3. A The system according to claim 2 wherein the monitoring component identifies failure in the monitored component when no response packets are received back during either the first or a second monitoring period.

4. The system according to claim 1, wherein the application includes a web browser application, the monitored component includes a web server, and the request and response packets contain data used for exchanging web browser application-specific information with the web server that is not associated with operational status information of the web server.

5. The system according to claim 1, wherein the application includes an authentication application, the monitored component includes an authentication server, and the authentication request and response packets contain data used for exchanging authentication application-specific information with the authentication server that is not associated with operational status information of the authentication server and the authentication request and response packets are not specifically ping packets.

6. The system according to claim 5, wherein the authentication application comprises a Remote Access Dial-In User Service (RADIUS) application.

7. A monitoring system, comprising:
a network access server (NAS) for a Remote Access Dial-In User Service (RADIUS) application to transmit an access request packet to a primary RADIUS server and to receive a corresponding response packet from the primary RADIUS server,
a component to detect failure in the primary RADIUS server by comparing a number of RADIUS request packets with a number of RADIUS response packets that are already transmitted between the NAS and the primary RADIUS server without exchanging any ping specific packets, wherein the primary RADIUS server is considered fail if one or more access request packet is transmitted and no corresponding response packet is received by the network access server during a designated monitoring period.

8. The system according to claim 7 including at least one standby RADIUS server, the component redirecting the access requests to the standby RADIUS server when the component identifies failure in the primary RADIUS server.

9. The monitoring system of claim 7, the access request packet contains a user name, an encrypted password, a NAS IP address and port information.

10. The monitoring system of claim 7, the response packet is an access reject or an access accept.

11. The monitoring system of claim 10, the access accept contains a list of attribute-value pairs that describes the parameters to be used for a session, including service type, protocol type, IP address to assign the user, access list to apply or a static route to install in the NAS routing table.

12. A method for monitoring a component, comprising:
counting a number of application-specific request packets sent during a monitoring period with a number of response packets received pursuant to the sent request packets wherein
the request and response packets contain information that is used by a monitored component to perform an application that is not associated with component operation status monitoring, and wherein the request and response packets are not specifically ping packets;
identifying failure in a monitored component if one or more request packets are sent and no corresponding response packet is received by a monitoring component during a designated monitoring period; and
using the request packets and response packets as part of an authentication process for gaining access to a system.

13. The method according to claim 12 including counting the request packets and response packets for a Remote Access Dial-In User Service (RADIUS) request and response authentication protocol.

14. The method according to claim 12 including:
identifying failure in the monitored component when one or more request packets are sent during the designated monitoring period and some, but not all, response packets are received during the designated monitoring period.

15. A The method according to claim 12 including:
identifying failure in the monitored component when the request packets are sent during a first monitoring period and no response packets are received during the first monitoring period;
monitoring for response packets during a second monitoring period;
identifying failure in the monitored component as dead when no response packets are received during the first or second monitoring period; and
removing the potentially failure identification from the monitored component when response packets are received during the second monitoring period.

16. A The method according to claim 12 including selecting the designated monitoring period to be at least as long as a time required for the monitored component to receive a request packet and send back a response packet.

17. A The method according to claim 12 including:
sending the request packets from a network access server to a primary authentication server; and
redirecting the requests to a standby authentication server when the primary authentication server is identified fail.

18. An electronic storage medium containing computer executable code for monitoring a component, the computer executable code comprising:
code for counting a number of application-specific request packets sent during a monitoring period with a number of response packets received pursuant to the sent request packets; wherein
the application-specific request and response packets contain information that is used by a monitored component to perform an application that is not associated with
component operation status monitoring, and wherein the request and response packets are not specifically ping packets;
code for identifying failure in a monitored component if one or more request packets are sent and no corresponding response packets are received by a monitoring component during a designated monitoring period.

19. The electronic storage medium according to claim 18 including code for counting the request packets and response packets for a Remote Access Dial-In User Service (RADIUS) request and response authentication protocol.

20. The electronic storage medium according to claim 18 including:
- code for identifying failure in the monitored component when one or more request packets are sent during the designated monitoring period and some, but not all, response packets are received during the designated monitoring period.

21. The electronic storage medium according to claim 18 including:
- code for identifying failure in the monitored component when the request packets are sent during a first monitoring period and no response packets are received during the first monitoring period;
- code for monitoring for response packets during a second monitoring period;
- code for identifying failure in the monitored component when no response packets are received during the first or second monitoring period; and
- code for removing the potentially failure identification from the monitored component when response packets are received during the second monitoring period.

22. The electronic storage medium according to claim 18 including:
- code for sending the request packets from a network access server to a primary authentication server; and
- code for redirecting the requests to a standby authentication server when the primary authentication server is identified fail.

23. A system for monitoring a component, comprising:
- means for counting a number of application specific request packets sent during a monitoring period with a number of response packets received pursuant to the sent request packets wherein the request and response packets contain information that is used by a monitored component to perform an application that is not associated with component operation status monitoring and wherein the request and response packets are not specifically ping packets;
- means for identifying failure in a monitored component if one or more request packet is sent and no corresponding response packet is received by a monitoring component during a designated monitoring period.

24. The system according to claim 23 including means for counting the request packets and response packets for a Remote Access Dial-In User Service (RADIUS) request and response authentication protocol.

25. The system according to claim 23 including:
- means for identifying failure in the monitored component when one or more request packets are sent during the designated monitoring period and some, but not all, response packets are received during the designated monitoring period.

26. The system according to claim 23 including:
- means for identifying failure in the monitored component when the request packets are sent during a first monitoring period and no response packets are received during the first monitoring period;
- means for monitoring for response packets during a second monitoring period;
- means for identifying failure in the monitored component when no response packets are received during the first or second monitoring period; and
- means for removing the potentially failure identification from the monitored component when response packets are received during the second monitoring period.

27. The system according to claim 23 including:
- means for sending the request packets from a network access server to a primary authentication server; and
- means for redirecting the requests to a standby authentication server when the primary authentication server is identified fail.

\* \* \* \* \*